United States Patent [11] 3,621,236

[72] Inventors Emil J. Hlinsky
 Oakbrook;
 Allen D. Siblik, Mundelein, both of Ill.
[21] Appl. No. 37,502
[22] Filed May 15, 1970
[45] Patented Nov. 16, 1971
[73] Assignee MacLean-Fogg Lock Nut Co.
 Mundelein, Ill.

[54] CONVERTIBLE SECUREMENT APPARATUS FOR SECURING STANDARD CONTAINERS AND NONSTANDARD CARGO ON VEHICLES
17 Claims, 15 Drawing Figs.
[52] U.S. Cl. .................................. 296/35 A,
 105/366 B, 105/368 T, 105/369 A, 248/119 R,
 248/361 A, 280/179 A, 280/DIG. 8
[51] Int. Cl. ........................................ B60p 7/08
[50] Field of Search ........................... 296/35 A;
 280/179 R, 179 A, DIG. 8; 105/366 B, 368 T, 369
 A; 248/119 R, 361 R, 361 A; 214/515; 294/815 F

[56] References Cited
UNITED STATES PATENTS
3,454,260 7/1969 Schwiebert et al. ......... 254/186
3,507,226 4/1970 Nadherny .................... 105/366 B
3,508,502 4/1970 Sims ............................ 280/179 A X Primary Examiner—Benjamin Hersh
Assistant Examiner—Leslie J. Paperner
Attorney—Davis, Lucas, Brewer & Brugman ABSTRACT: Convertible securement apparatus for a flatbed vehicle such as a trailer unit. Dual purpose pedestal has a twist lock for the corner casting of a standard transportation container; and a winch for a tiedown chain for miscellaneous cargo. A special channel is fixed to the side of the vehicle bed. A hinge pin is connected to the pedestal by a narrow link and is loosely retained in an elongated hinge pin retaining space extending along the interior of the channel. The pedestal is movable fore and aft along the channel when its link is within an upwardly open, continuous groove, providing access to the elongated hinge pin retaining space. The channel has an elongated compartment below the hinge pin retaining space, separated by a wall which extends along the length of the channel, the wall having notches at a series of locations along the channel. These notches are wider than the link carried by the pedestal, thus, when the pedestal is aligned with one of the notches, it can be pivoted about the hinge pin and movable from one to the other of the following operable positions:
a. A container-locking position with the pedestal seated upright on a horizontal extension of the deck of the flatbed vehicle, and with the twist lock upright to engage a container, and
b. a cargo tiedown position with the pedestal upside down in the channel compartment below the hinge pin retaining space, and with the winch in position to engage a cargo tiedown chain.

PATENTED NOV 16 1971 3,621,236

INVENTORS
Emil J. Hlinsky
Allen D. Siblik
BY
Davis, Lucas, Brewer & Brugman
ATTORNEYS

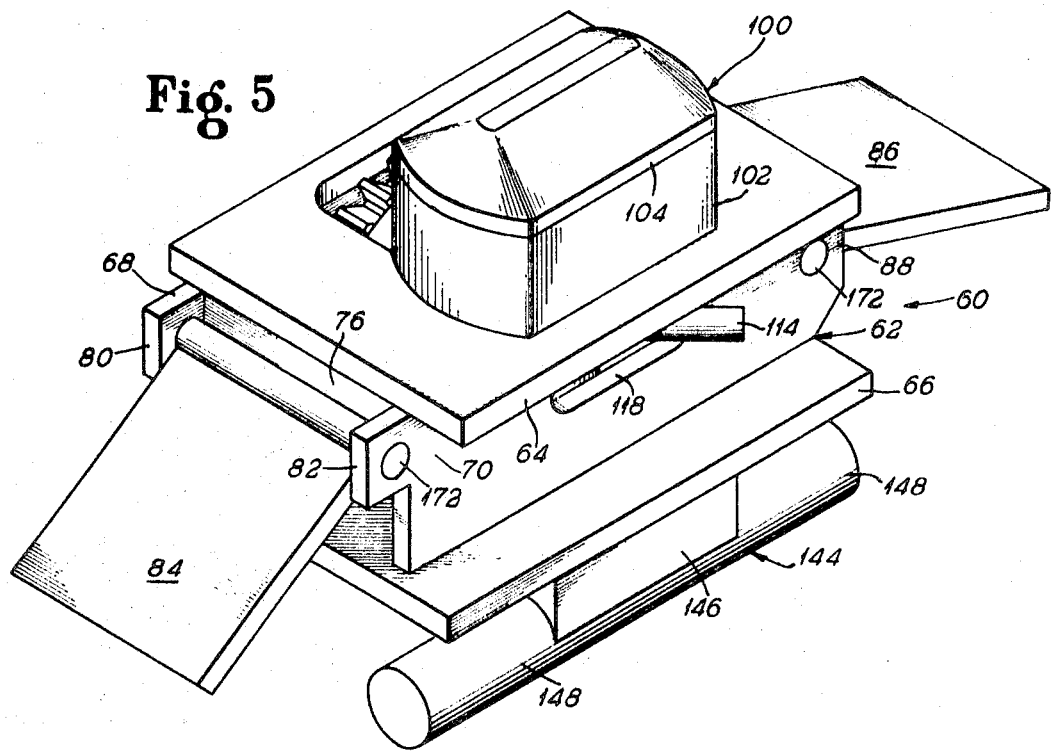

INVENTORS
Emil J. Hlinsky
Allen D. Siblik

BY Davis, Lucas, Brewer & Brugman
ATTORNEYS

PATENTED NOV 16 1971 3,621,236

INVENTORS
Emil J. Hlinsky
Allen D. Siblik

BY
*Davis, Lucas, Brewer & Brugman*
ATTORNEYS

CONVERTIBLE SECUREMENT APPARATUS FOR SECURING STANDARD CONTAINERS AND NONSTANDARD CARGO ON VEHICLES

BACKGROUND OF THE INVENTION

The field of this invention is generally a releasable lock and tiedown for loads on vehicles, of the class generally associated with U.S. Pat. Office Classification No. 296.

The invention relates to a combination lock, and tiedown winch, for a chainlike element, which is convertible to secure either standard transportation containers, or miscellaneous nonstandard cargo, or a combination of both.

It is customary to transport loads on ships, railway cars and truck or trailer units, in closed containers which are of standard dimensions, for example, multiples of 10 feet long, up to about 40 feet. These containers are customarily transported on vehicles such as trailer units which are 40 feet long so that any combination of containers totaling 40 feet in length can be transported on a single vehicle. These containers are releasably attached to outriggers on the vehicle bed or chassis, or to edges of the vehicle deck, by releasable locking means which have been standardized for engagement with standard fittings built into the corners of the container. The containers are customarily loaded at the point of origin and are not unloaded until they reach their ultimate destination. They have been standardized to such an extent that the same containers may be mounted on railroad cars, ships, trucks or trailers, so the cargo within a container can be shipped without disturbing the original packing at any intermediate or transfer point.

Where a trailer unit must carry any combination of 10-, 20-, or 30-foot containers, or a single 40-foot container, each trailer unit must have a sufficient number of locking devices to secure as many as four 10-foot containers. This requires eight special corner locks along each side of the deck to fasten the total of 16 corners on the four containers.

In addition to the standardized containers referred to above, much cargo is freight of nonstandard dimensions, such as crates, pallets of lumber, pipe assemblies, cylindrical objects, farm and industrial machinery, and miscellaneous objects of every size and shape. These cannot be fastened by the special locking devices provided for the standardized containers. Federal Highway Administration regulations require at least one tiedown device, including a 16,200-pound test chain, for each 10 feet of load length of cargo on a flatbed truck or trailer.

Conventional locking devices for standard containers often include locking elements which project at all times above the vehicle deck. These interfere with use of the vehicle for transporting nonstandard cargo which cannot be held by the conventional locking elements. Furthermore, the locking elements are often fixed at such locations that they cannot handle special or semistandard container lengths such as 24 feet, 30 feet and 35 feet. Conventional locking elements are not readily convertible to chain tiedown purposes and for this reason a single set of standard container-locking devices on a flatdeck truck or trailer is not readily convertible to multipurpose use, where they may secure standard containers on one trip, or nonstandard cargo on another trip, or a combination of standard containers and nonstandard cargo on still another trip.

SUMMARY OF THE INVENTION

It is therefore a general object of the present invention to provide securement apparatus for the side of a vehicle bed or deck, which is adjustable for use at various locations along the bed and is effective either to secure standard containers or nonstandard cargo.

In particular, it is an object of the present invention to provide a pedestal which supports both a container lock and a cargo tiedown winch, the pedestal being retained by a hinge pin in a slideway formed in a special channel fixed, or built into, the side of the vehicle bed, the pedestal being pivotable about its hinge pin between an upright position on the channel where the lock is engageable with a transportation container, and further being pivotable to an inverted position within a side compartment in the channel where the winch can tension a chain or the like, extending from cargo on the bed.

Another object is the provision of a subassembly, including a special channel section and pedestal which can be fixed to the side of an existing trailer unit to adapt it to carry out the principles of the present invention.

Another object is to provide a securement pedestal which is movable along the deck for use in an upright position to secure a container, and in an inverted position to secure cargo, and a unique arrangement for locking the pedestal against movement along the bed in either of its upright or inverted operable positions.

BRIEF DESCRIPTION OF THE DRAWINGS

Other objects and advantages of the invention will be apparent from the following description taken in connection with the accompanying drawings in which:

FIG. 5 is a perspective view of a securement pedestal housing, in upright position, ready for engagement with a container corner casting;

FIG. 6 is a fragmentary view of FIG. 5 with the T-head rotated to locked position;

FIG. 7 is a vertical sectional view of FIG. 3 taken along the line 7—7;

FIG. 10 is a view similar to FIG. 9 but showing the securement pedestal housing in its fully inverted position, with its winch in position to engage a cargo tiedown chain, or the like;

DESCRIPTION OF THE PREFERRED EMBODIMENT

Figure 1:
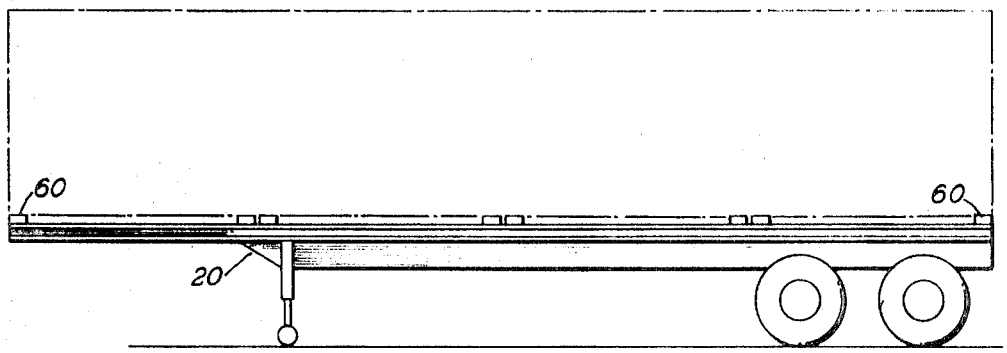
FIG. 1 is a schematic side elevation of a trailer unit carrying a single standard container (shown in broken lines) whose length equals that of the trailer unit.
Figure 2:
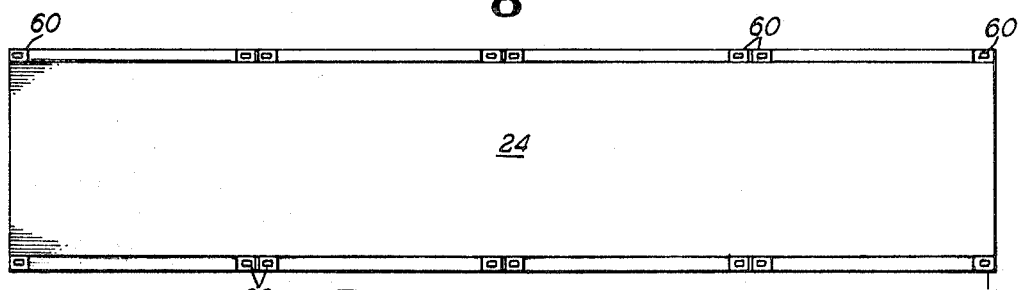
FIG. 2 is a schematic top view of the trailer unit of FIG. 1, with the container removed from it, and showing generally the arrangement of locking devices for a trailer unit which is adapted to secure combinations of standard containers having lengths in multiples of 10 feet long.

Referring now to FIGS. 1 and 2, a trailer unit 20 is illustrated having a length of 40 feet. A single, elongated standard container 22, which also has a length of 40 feet, is carried by the bed or deck 24 of the trailer unit.

Any group of standard containers which have lengths in multiples of 10 feet may be secured in end-to-end relation up to a total length of 40 feet on the trailer unit. For example, a trailer unit 20, which itself is 40 feet long, may carry one 40-foot container, two 20-foot containers, four 10-foot containers or various combinations thereof.

Figure 9:
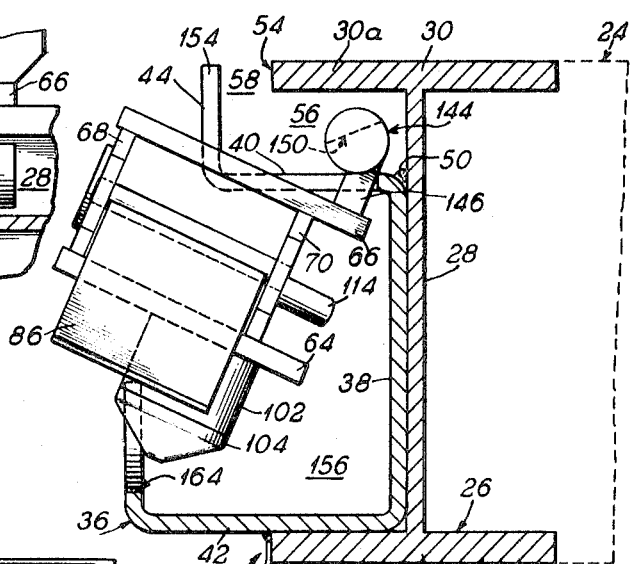
FIG. 9 is a view similar to FIG. 7 showing the securement pedestal housing being swung, downward, into its inverted position.

Refer to FIG. 9. A vehicle bed 24 may have as part of its main structural assembly, an I-beam 26 extending along each side. The I-beam may be of usual construction, having a vertical web 28 and top and bottom flanges 30, 32.

The upper, horizontal, overhanging, extension, or ledge 30a of flange 30, comprises an important part of the present invention, which is already provided on vehicles having such I-beam side members. For other types of vehicles, an equivalent of the ledge 30a should be provided.

The convertible securement apparatus of the present invention comprises channel means generally designated 34. In the embodiment illustrated, this includes the upper, outer portions of the I-beam 26 and the channel section 36. The latter has a vertical web 38 with upper and lower, outwardly extending flanges 40 and 42, respectively, having upper and lower upstanding marginal walls 44 and 46. Lower flange 42 is wider than upper flange 40 to accommodate the winch means to be described. As best shown in FIG. 7, a spacer and reinforcing member 48 is affixed as by welding, between the upper flange of the I-beam 26 and upper flange 40 of channel section 36. Channel section 36 and I-beam 26 may be assembled as by welding, at 50 and 52.

The upper flange 40 and its marginal wall extension 44 comprise, together, a wall which is spaced below and beyond the margin 54 of the horizontal ledge 30a, thereby defining an elongated hinge pin retaining space 56 which is bounded by the upper portion of web 28, wall 44, flange 40, and ledge 30a. An upwardly open, continuous groove 58, between the margin 54 and the wall 44, extends for the entire length of the channel means 34 and provides continuous access to the hinge pin retaining space 56. The hinge pin which is retained in this space will be described subsequently.

Refer to FIGS. 5 and 7. A pedestal 60 is mounted on the channel means 34 for fore-and-aft movement to the position required, and is pivotably adjustable between upright and inverted positions, depending on the kind of load to be secured on the deck.

The pedestal comprises a housing generally designated 62, which in the present case is made of individual steel plates fabricated to suitable shape and welded together into one unitary assembly. A solid casting or other suitable fabrication, may be used to provide equivalent housing. The housing will be described with parts designated as "upper" or "lower," etc., with reference to FIGS. 5, 6 and 7, which, for consistency, will be referred to as the "upright" position. The "inverted" position is that shown in FIGS. 10, 13 and 14.

The housing 62 comprises upper and lower horizontal plates 64, 66. These are spaced apart and held separated by sidewalls 68 and 70, and an intermediate parallel wall 72. End walls 74 and 76 (FIG. 13) close the fore-and-aft ends of the housing. End wall 76 is formed with an aperture 78.

Figure 11:
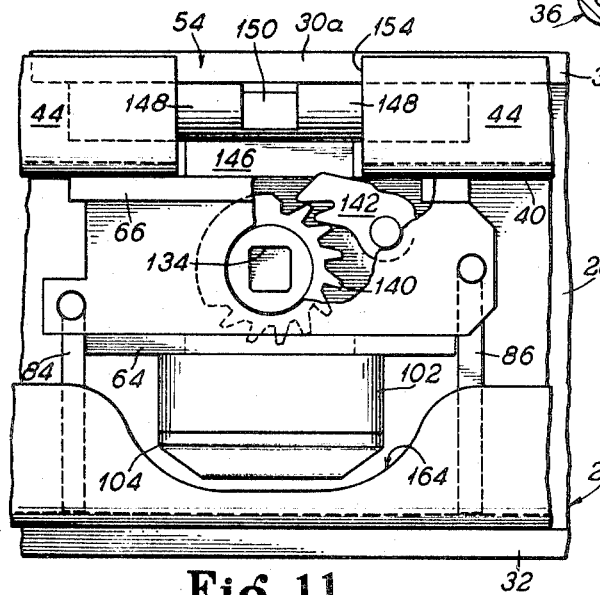
FIG. 11 is a view of FIG. 10 taken along the line 11—11 with certain parts cut away.
Figure 10:
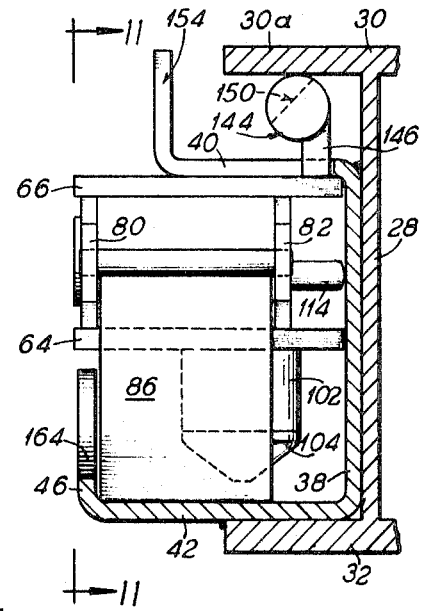
Figure 12:
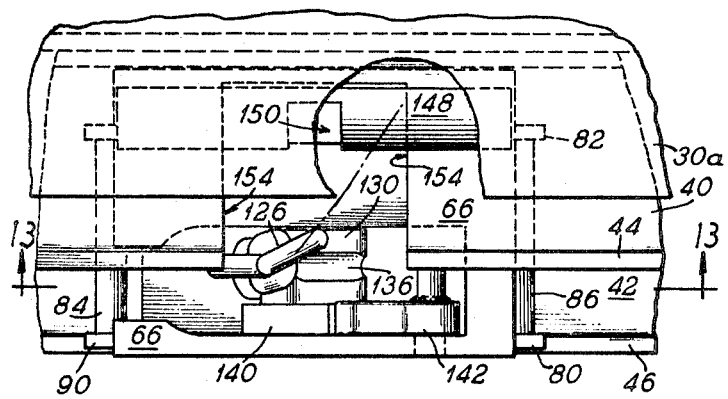
FIG. 12 is a top view of FIG. 11 with a portion of the top flange removed for clarity.
Figure 13:
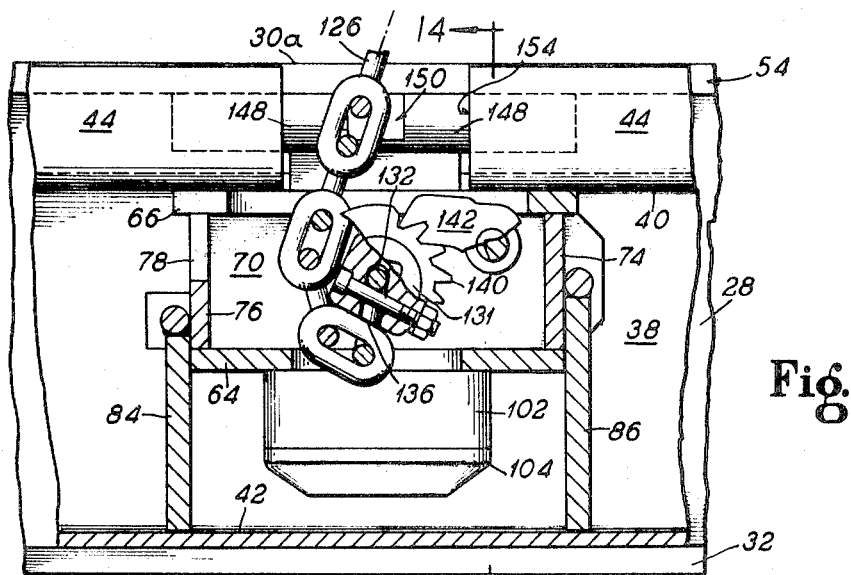
FIG. 13 is a vertical cross-sectional, partly cut away, view of FIG. 12 taken approximately on the line 13—13.

At their opposite ends, as best shown in FIG. 5 and FIG. 13, walls 68, 70 have a pair of apertured ears 80, 82 pivotably supporting a hinged, stabilizing prop 84. Similarly, another hinged stabilizing prop 86 is pivoted between ears 88, 90 on the other end of the housing. As shown in FIGS. 10 and 11, when the props 84, 86 are in their vertical positions, they jack the baseplate 66 up against the underside of the upper flange 40, and engage the inner surface of the lower, upstanding marginal wall 46 to hold the pedestal stably in place.

Figure 4:
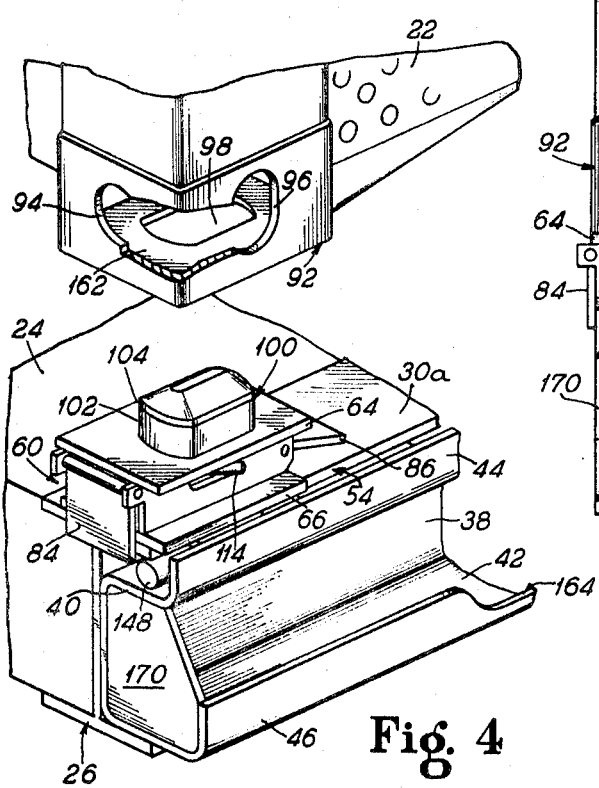
FIG. 4 is a perspective view of the portion of the structure shown in FIG. 3, in unlocked position, and with the container lifted away from the trailer unit to better illustrate the parts.
Figure 3:
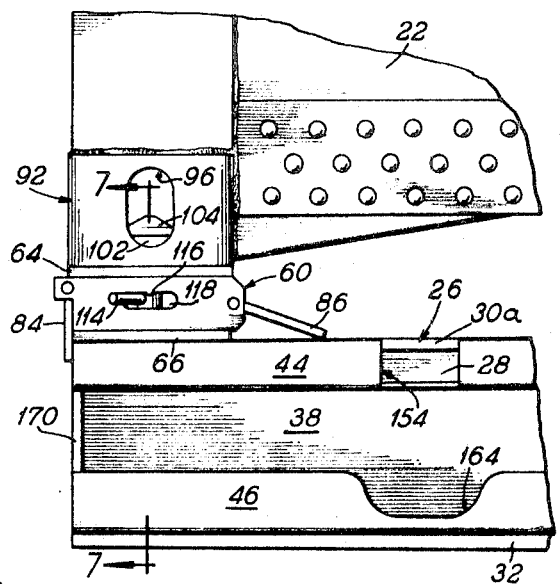
FIG. 3 is an enlarged, fragmentary, left-end view of FIG. 1, showing a standard container locked in place.
Figure 8:
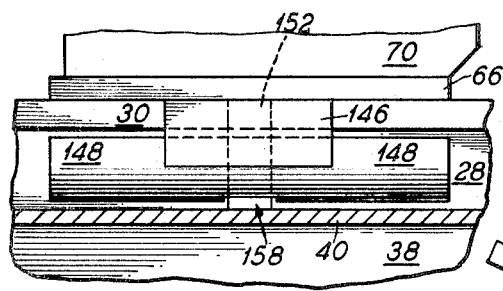
FIG. 8 is a sectional view of FIG. 7 taken along the line 8—8.

Refer now to FIGS. 3 and 4, where the standardized corner casting 92 for a transportation container is shown. Such a corner casting, or fitting, 92 is provided at each lower corner of a container. It is a hollow, generally cubical, casting, or fitting, having end and side openings 94, 96, and an elongated bottom slot 98. The shape, size and placement of all four slots 98 at the corners of a standard container comply with industry specifications for each special length of container. The slot is defined by two generally straight, parallel, sidewalls and two slightly arcuate end walls. It is through these slots 98 that the locking means of the present invention pass and interlock when a standard transportation container such as that numbered 22, is mounted on a vehicle.

Each pedestal 60 includes locking means 100, which is engageable with a slot 98 in one of the corner castings 92. The locking means 100 includes a bearing boss 102 and a T-head 104 mounted atop a shank 106, which is rotatably journaled within a bore 108 in the bearing boss 102, and which has a lower portion extending down between vertical plates 70 and 72. The bottom of the shank 106 has an axial counterbore 110 with compression spring 122 seated within it and bearing against the top of baseplate 64. This biases the shank 106 in an upward direction and tends to stabilize the shank in a locked (FIG. 6) or unlocked (FIG. 5) position, with the handle 114 on one side or the other of the downwardly projecting detent 116 (FIG. 3) in the handle slot 118.

Thus, when the pedestal 60 is in upright position, and the T-head 104 is unlocked, as shown in FIGS. 4 and 5, the container corner casting 92 can be lowered onto the locking means 100, and then the T-head 104 rotated to locked position by the handle 114, as shown in FIGS. 6 and 7.

A chain tiedown winch 119, for nonstandard or miscellaneous cargo tiedown purposes, is journaled for rotation between plates 68 and 72. This may, for example, be a unit similar to that shown in Schwiebert, et al., U.S. Pat. No. 3,454,260 and will be briefly described as follows.

A winch drum 130 is journaled for winding between plates 68 and 72, for example, by integral axle portion 131, extending into accommodating openings in the walls 68, 72. The winch drum 130 includes a radial slot 132 for the first link of a chain 126. The first link is held in place by a bolt 131a in cross-bore 133. A socket 134 is provided in the exterior axle portion 131 for coupling reception with a ratchet wrench or power tool. Guide grooves 136, etc., extend centrally around the periphery of the drum 130 and provide nesting reception for links of the chain 136 used to secure the crates 122, for example, in FIG. 15.

A ratchet wheel 140, integral with the drum 130, and gravity-biased pawl 142, enable the chain 126 to be tightened and held taut to secure cargo.

The pedestal 60 has hinge pin means 144 in spaced parallel relationship with the lower side of the base 66 (FIGS. 5 and 7) and is offset toward the outer edge thereof. The two are connected by a relatively narrow link 146. The hinge pin means comprises a pair of axially aligned, circular, rod sections 148, having a semicircular notch 150 at their midsection. As shown in FIG. 7, a gusset 152 is provided at intervals along the length of the hinge pin retaining space 56 for engaging the slot 150 when the pedestal is in its upright position (FIG. 7). The hinge pin means is retained within the space 56 by reason of the fact that the access slot 58 is narrower than the diameter of the pins 148.

To enable the pedestal 60 to be pivoted readily between upright and inverted operative positions, a slot 154 is provided in the wall means which separates the hinge pin retaining space 56 from the lower compartment 156 within the channel section 36. Specifically, this groove 154 is somewhat wider than the link 146 to allow the latter to pass through it, and the groove extends from the upper upstanding marginal wall 44 into the upper flange 40, terminating just short of the web 38, all as shown in FIG. 9.

Use and operation of the convertible pedestal 60 will now be described. First, for securement of a standard container 22; and second, for securement of nonstandard or miscellaneous cargo such as the crates 122.

To secure the 40-foot container 22, the four pedestals 60 at the four extreme corners of the vehicle bed 24 will be raised to their upright position as shown in FIGS. 4, 5 and 7. These will be stabilized against fore-and-aft movement by engagement of pedestal notches 150 with corresponding edges 158 of gussets 152 (FIG. 7). The container 22 will then be lowered so that all four corner castings 92 are seated on the top pedestal plate 64, as shown in broken lines in FIG. 7. By then swinging the respective handles 114 clockwise (looking down) 90°, past the detent 116, the T-head 104 will be moved to its locked position, as shown in FIGS. 6 and 7, thereby engaging the bottom plate 162 of the corner casting 92. This locks it until it arrives at its destination when it can be released by swinging all four handles 114 back to the unlocked position shown in FIG. 5.

Figure 15:
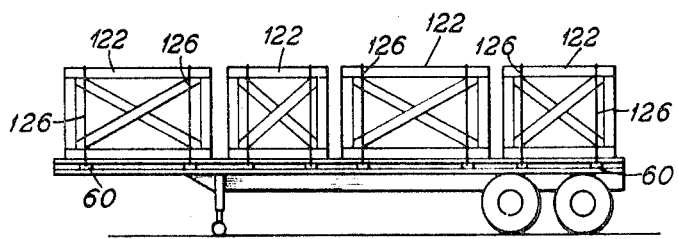
FIG. 15 is a side view of the trailer unit of FIG. 1, with the securement pedestal housing converted to chain tiedown (as shown in FIGS. 10–14) illustrating the securement of nonstandard cargo, namely, crates.

Now consider the loading of four crates 122, as shown in FIG. 15.

All pedestals 60, which are in their upper operative position on the ledge 30a, are released from the gusset 152 by leftwise movement (FIG. 7) and then moving the pedestal along the groove 58 until it is aligned with the particular groove 154, which places it at the proper fore-and-aft position along the channel section 36. It is then pivoted downward through the groove 154. The lower, upstanding, marginal wall 46 has a cutout 164 (FIGS. 9, 10 and 11) which allows the bearing boss 102 and T-head 104 clearance to swing into the compartment 156. As shown in FIG. 9, the stabilizing props 84, 86 will be swung outward to clear the upper edge of wall 46.

Figure 14:
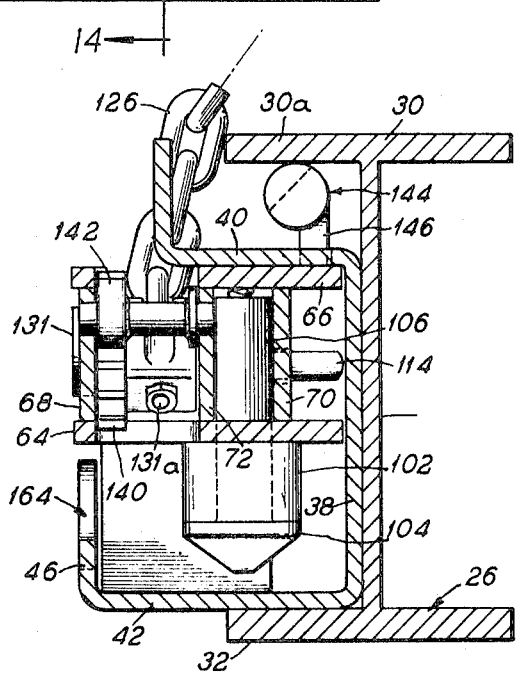
FIG. 14 is a vertical sectional view of FIG. 13 taken along line 14—14.

The inverted operative position for chain tiedown is shown in FIGS. 10-14. It will be understood that all eight pedestals on each side of the trailer unit will be in the position shown in FIG. 15. The chains 126 will be trained across the crates and each tensioned by turning the drums 130 on both sides of the trailer unit, if necessary. Note that the chain in FIGS. 13 and 14 is trained upward through the groove 154. The resulting locking engagement between the chain and the flange 40 and all 154 stabilize the pedestals against fore-and-aft movement in this position.

The pivoted props 84, 86 have sufficient length that, when they are in vertical position, they engage the floor (lower flange) 42 of channel section 36, and hold the pedestal up with its inverted base 66 up adjacent the underside of the flange 40 (FIGS. 10, 13 and 14).

When the props 84, 86 are in their jacking or vertical positions, they will be blocked against outward movement by the portions of the marginal wall 46 on both sides of the cutout 164; see FIG. 11. This neutralizes the torque reaction from the chain which exerts a clockwise torque reaction about the hinge pin means 144; see FIG. 14.

As described in the introduction, the invention is broadly applicable to two kinds of vehicles: (1) Those which already have a reinforcing I-beam 26 running along the sides of their decks, in which case only the channel section 36 and pedestals 60 and chain 126 need be provided to practice the invention; and (2) those which require the entire assembly whose cross section is shown in FIG. 9.

By the present invention, a completely new system of securement has been provided in which one vehicle can handle all types of loads, including standard containers and nonstandard cargo. An ordinary flatbed trailer may be readily adapted by attachment of channel sections 36, with or without some equivalent of the I-beam 26, as mentioned above. A truck or trailer used to carry a container load in one direction may carry lumber or nonstandard lading on the return and thus never needs to double back empty.

An important feature of the system is the special convertible pedestal 60, having the locking means 100 and winch means 119 built into it and readily pivotable between upright and inverted positions for alternative use, either of the twist lock 100 or the winch 119. This eliminates all load-binder hardware which otherwise would have to be provided. The pedestals with twist lock means 100, winch means 119, and chains 126 with all necessary hooks and compression fittings, may readily be stored in the channel compartment 156 for immediate use when the particular load requires it. An end plate 170 (FIG. 4) prevents inadvertent loss of these components.

Loads may be carried both ways on many more runs than is now possible with conventional equipment. A far better return is possible for the equipment investment. And a fleet of ordinary flatbeds becomes a versatile fleet of container transporters as well.

The securement system channel section 36, with or without the I-beam 26, may replace a part of the existing structure in a truck or trailer unit, in a way which may actually increase strength and decrease dead weight.

The entire system is engineered for these advantages: Faster loading and unloading; more different kinds of loads than is possible with conventional equipment; and much safer transit. Stowage of load binder is so easy that it is almost automatic. On a typical trailer unit, eight pedestal/winch units 60 may be used in the manner described, or more, or less, on each side of the deck, as is required by the use contemplated for the equipment.

An important part of the part of the present invention, enabling it to function in the manner described, is the special, elongated channel section 36, with the I-beam 26 which supports the ledge 30a; or the channel section 36 alone, where it is adapted to fit the side of a vehicle already having as part of its structure some equivalent of the I-beam 26 or ledge 30a. This provides the seat on the ledge 30a for the pedestal in upright position, the elongated hinge pin retaining space 56, the compartment 156 in which the pedestal is inverted in winch-operable position; and the apertured wall 40, 44 which separates the space 56 and compartment 156 while enabling the pedestal to pivot between upright and inverted positions.

We claim as our invention:

1. Convertible securement apparatus for a flatbed vehicle comprising:

elongated channel means extending along one side of the vehicle bed including a horizontal ledge, a wall spaced below the ledge to define an elongated hinge pin retaining space therebetween and an upwardly open continuous groove along the margin of the ledge providing access to said space, and an elongated compartment below the wall;

a pedestal with a base having on one side thereof lock means engageable with a corner casting of a standard cargo container and winch means alternatively engageable with a chainlike cargo tiedown element;

said pedestal having hinge pin means in spaced parallel relationship with the side of the base opposite the lock means, and a relatively narrow link interconnecting the base and hinge pin means;

said pedestal and channel means being assembled with the hinge pin means loosely retained in said hinge retaining space;

said wall having a notch wider than said link, whereby when they are aligned, said pedestal is movable between the following two alternatively operable positions:

a. A container-locking position with said pedestal seated upright on said ledge while said lock means is upright on the base and adapted to engage a container, and b. a cargo tiedown position with said pedestal inverted below said wall while said lock means is inverted below the base, in said compartment, and said winch means is adapted to engage a flexible cargo tiedown element extending from cargo on the bed.

2. Convertible securement apparatus according to claim 1 in which said horizontal ledge is substantially a horizontal continuation of the top, deck surface of the vehicle bed.

3. Convertible securement apparatus according to claim 1 in which said channel means has a floor and an upstanding marginal side flange defining said compartment below said notched wall, and said upstanding marginal side flange has an indentation aligned with each of said notches to provide clearance for pivoting said pedestal into and out of said compartment.

4. Convertible securement apparatus according to claim 1 in which the hinge pin is discontinuous and comprises two axially aligned pin portions with overall length sufficient to span said notch to provide pivotal support for the pedestal when being moved between its said two operable positions.

5. Convertible securement apparatus according to claim 1 in which interlocking means between the channel and the pedestal is effective to lock the pedestal against movement along the bed when the pedestal is in its said container-locking position.

6. Convertible securement apparatus according to claim 1 in which a flexible element may be trained from the winch means to cargo on the bed, through said notch, to lock the pedestal against movement along the bed when the pedestal is in its said cargo tiedown position.

7. Convertible securement apparatus according to claim 1 in which said channel means includes a vertical web with top and bottom horizontal flanges, each flange having a respective upstanding marginal side flange, said wall spaced below the ledge comprising said top horizontal flange and its respective upstanding marginal side flange, each of said notches extending from said top horizontal flange into and through said respective upstanding marginal side flange.

8. Convertible securement apparatus according to claim 1 in which said hinge pin means has a greater cross-sectional dimension than the width of said groove to retain said hinge pin means within said hinge pin retaining space.

9. Convertible securement apparatus according to claim 1 in which the pedestal link extends through the upwardly open continuous groove in one of said operable positions to enable the pedestal to be moved fore-and-aft along the channel means.

10. Convertible securement apparatus according to claim 1 in which said channel means has a floor spaced below said wall to define the bottom of said compartment, and said pedestal has a pair of fore-and-aft pivotal prop members which are pivotable to engage the floor and hold the pedestal base upward against the underside of said wall when the pedestal is in one of its said cargo tiedown positions.

11. Convertible securement apparatus according to claim 10 in which said floor has an upstanding marginal wall and said pivotal prop members are engageable with said upstanding marginal wall to stabilize the pedestal against swinging movement about said hinge in response to tightening the winch means.

12. Convertible securement apparatus for attachment to the side of a flatbed vehicle having an elongated, overhanging, horizontal ledge extending along said bed, comprising:
elongated channel means having an upright web with upper and lower horizontal flanges having upper and lower upstanding marginal walls respectively;
said channel means being adapted to be fixed to the side of such flatbed vehicle with the upper horizontal flange spaced below said ledge to define a hinge pin retaining space and with the upper upstanding marginal wall spaced outwardly from the margin of the ledge to define an upwardly open groove providing access to said hinge pin retaining space;
a pedestal with a base having on one side thereof lock means engageable with a corner casting of a standard cargo container and winch means alternatively engageable with a flexible cargo tiedown element;
said pedestal having hinge pin means in spaced parallel relationship with the opposite side of the base, and a relatively narrow link interconnecting the base and hinge pin means;
said pedestal adapted to be assembled, when said channel is fixed to the side of the vehicle as above, with the hinge pin means loosely retained in said hinge pin retaining space;
said upper marginal wall and upper horizontal flange having, at intervals therealong, notches each wider than said link, whereby, when the link is aligned with one of said notches, and the channel is fixed to the vehicle as above, the link can pass through the notch enabling the pedestal to be pivotable movable between the following two alternatively operable positions:
a. a container-locking position with said base seated upright on said ledge and said lock means upright on said base and adapted to engage a container, and
b. a cargo tiedown position with said base inverted below said wall in a compartment between the upper and lower horizontal flanges, and said winch means is engageable with a flexible cargo tiedown element extending from cargo on the bed.

13. Convertible securement apparatus for a flatbed vehicle comprising:
an elongated horizontal ledge extending from one side of the bed;
a first elongated angle beam having a first horizontal web extending outwardly from the side of the bed and spaced below and parallel to said ledge, and having a first vertical flange extending upwardly therefrom and spaced outwardly from the outer edge of said horizontal ledge;
a second elongated angle beam having a second horizontal web spaced below and parallel to the first horizontal web and having a second vertical flange extending upwardly therefrom and spaced outwardly from said first vertical flange;
a pedestal housing having, on the obverse side thereof, twist lock means engageable with a standard corner casting of a standard cargo container, and winch means engageable with a flexible cargo tiedown element;
said pedestal housing having a hinge pin in spaced parallel relationship with the opposite side thereof, and a link connecting said housing and hinge pin;
the first elongated angle beam having at intervals therealong a notch wider than said arm extending from said first vertical flange into said first horizontal web;
said pedestal having its hinge pin loosely pivoted in the space between said ledge and said first horizontal web and movable between two operative positions as follows:
a. a container locking position with said base atop said ledge and said twist lock means upright,
b. a cargo tiedown position with said base beneath said first horizontal web and said winch means aligned generally between spaced vertical planes including said first and second vertical flanges; and
said pedestal being pivotable to swing said link through said notch to enable said pedestal to pivot between said two operative positions.

14. In convertible securement apparatus for the side of a vehicle bed, elongated channel means for a container and cargo-supporting pedestal having a cross section comprising:
a vertical web attachable to the side of the bed;
top and bottom horizontal flanges extending in the same direction from said web and bed when attached thereto, the bottom horizontal flange being wider than the top horizontal flange for supporting a pedestal carrying a winch;
said bottom horizontal flange having an upstanding marginal side flange;
said top horizontal flange having an upstanding marginal side flange;
said upstanding marginal side flange on the bottom horizontal flange having an upper edge terminating below the level of the top horizontal flange thereby defining a continuous horizontally extending access slot therebetween;
said top horizontal flange and its corresponding upstanding marginal side flange having notches spaced at intervals therealong;
said web, top horizontal flange, bottom horizontal flange, and marginal side flange on the latter defining an internal compartment for means comprising a hinge pin on a supporting pedestal which depend from said top horizontal flange within one of said notches.

15. In convertible securement apparatus, the combination of claim 14 in which the channel means includes a horizontal ledge above the top horizontal flange, said ledge being spaced above said top horizontal flange to define an elongated hinge pin retaining space therebetween, and said ledge terminating short of said upstanding marginal side flange to define an elongated access groove therebetween.

16. In convertible securement apparatus, the combination of claim 15 in which the ledge is a portion of a beam separate from said channel means and attachable thereto.

17. In convertible securement apparatus, the combination of claim 15 in which the ledge is part of the side portion of a vehicle to which the channel means is attachable.

* * * * *